(12) United States Patent
Clements

(10) Patent No.: US 6,810,674 B2
(45) Date of Patent: Nov. 2, 2004

(54) FUEL DELIVERY SYSTEM

(75) Inventor: Martin A. Clements, North Royalton, OH (US)

(73) Assignee: Argo-Tech Corporation, Cleveland, OH (US)

( * ) Notice: Subject to any disclaimer, the term of this patent is extended or adjusted under 35 U.S.C. 154(b) by 0 days.

(21) Appl. No.: 10/198,488

(22) Filed: Jul. 18, 2002

(65) Prior Publication Data

US 2004/0011052 A1 Jan. 22, 2004

(51) Int. Cl.[7] ............................................... F02C 9/28
(52) U.S. Cl. ..................................... 60/773; 60/39.281
(58) Field of Search ............................. 60/773, 39.281

(56) References Cited

U.S. PATENT DOCUMENTS

| | | | | |
|---|---|---|---|---|
| 4,004,412 A | * | 1/1977 | Burnell | .................... 60/39.281 |
| 5,715,674 A | * | 2/1998 | Reuter et al. | ............ 60/39.281 |
| 5,806,300 A | * | 9/1998 | Veilleux et al. | .......... 60/39.281 |

* cited by examiner

Primary Examiner—Louis J. Casaregola
(74) Attorney, Agent, or Firm—Fay, Sharpe Fagan, Minnich & McKee, LLP

(57) ABSTRACT

A fuel delivery system provides for closed loop mass flow control of fuel between a metering valve and a pump, such as a variable delivery pump. Changes in pressure across the metering valve are monitored and pump operation is altered in response thereto. A thermal controller monitors fuel temperature and recirculates a portion of the fuel flow through a heat exchanger. The fuel delivery system can be provided as original equipment or as a retrofit.

17 Claims, 5 Drawing Sheets

FUEL DELIVERY SYSTEM

BACKGROUND OF INVENTION

This application relates to a turbine engine assembly, and more particularly to a fuel delivery system for such an engine. It will be appreciated, however, that the system may find application in related systems or environments requiring high reliability, low cost, and low weight without sacrificing performance.

Presently available fuel delivery systems typically use a centrifugal boost stage that directs pressurized fluid into a filter and then through a gear stage or gear pump. The fuel is subsequently directed to a metering valve and into a pressurizing valve where it ultimately leads to fuel nozzles associated with the turbine engine. The centrifugal boost stage provides pressure and flow to adequately fill the high pressure stage with a homogenous liquid fuel, i.e., no vapor, under varying pump inlet conditions. For example, pump inlet conditions may include low pressure, high temperature, etc. In addition, the centrifugal boost stage serves as a sink for bypass fluid from the fuel control and provides a reference base pressure for use in the fuel control.

The high pressure positive displacement stage is typically a gear pump. The gear pump provides a positive flow to the system regardless of the system restriction, that is, up to a set point of a relief valve. The high pressure relief valve is incorporated in the main engine pump to protect the fuel system. Bypass flow is also provided prior to directing fuel through the metering valve. The bypass flow recirculates fuel back to the pump. The amount of bypass fuel is controlled by sensing on either side of a metering valve with a head regulator that provides an appropriate signal to a bypass valve. In addition, the system will typically use some of the pressurized fuel for actuator use.

Although these systems have proven effective to date, improvements in the acquisition and operating costs are deemed desirable. In addition, improved efficiency, life expectancy, and in particular greater efficiency at the idle descent over conventional systems is desirable. A reduction in the number of components used to meter fuel and control engine overspeed is also desirable. Moreover, reducing the number of system heat exchangers would serve all of the above-noted goals, as well as provide a significant reduction in engine level piping.

With the known systems, there is a need to supply the actuators as well as the fuel nozzles. With this dual role, a concern for transient flow demand from the actuation system must be accounted for. If a large demand is required for actuation supply, then overall demand from the pump is large and the fuel nozzle is inadequately served resulting in engine flame out. On the other hand, if more fuel is supplied to the fuel nozzle than is necessary, for example, when the actuator demand is reduced, then the engine is potentially subject to a stall.

Thus, in known systems there are generally three output paths from the pump. One path is directed to the metering valve, a second path to the actuators, and a third path for bypass purposes. This is similar to having three orifices disposed in parallel relation. In other words, a flow change in one orifice does not result in a big flow change in the other two. But, if a variable flow pump is used, the system reduces to the equivalent of two orifices and thus flow change in one results in a large flow change in the other orifice. Thus, a need exists for the pump to make this deficiency up quickly, i.e., a fast response. While others in the past have used the bypass as an attempted solution, this adds more components, rather than less components as is always desired.

SUMMARY OF INVENTION

An improved fuel delivery system providing for high efficiencies, fewer components, and increased reliability is provided.

According to one embodiment of the invention, a variable flow pump is operatively associated with a metering valve having closed loop mass flow control. The mass flow controller monitors pressure on either side of the metering valve and alters pump output in response thereto.

Another embodiment of the invention incorporates thermal management control of the pump fluid. Particularly, fluid exiting the pump is fed through a heat exchanger before being split between a thermal control valve and a downstream actuator use. If the system detects that a portion of the fluid needs to be recirculated for thermal purposes, the thermal control valve is opened to a desired level.

Preferably, a transducer monitors the pressure across the metering valve and a temperature probe provides desired data of the fuel temperature directed toward the actuation use.

A primary benefit is a closed control loop on delivered fuel mass flow instead of just a metering valve position.

In addition, an electrical overspeed system can be responsive to trip or shut-off, trim or upper speed limit, and/or governing functions such as speed settings.

Many components used in present systems are either combined or eliminated. For example, the bypass valve, head regulator, and logic select valve function are eliminated from a conventional fuel controller architecture. Three heat exchangers in the main, servo, and integrated drive generator (IDG) portions of the system are combined into a single unit.

A primary advantage of the invention resides in the ability to use a single loop control of mass flow that is proportionally controlled.

A substantial improvement in fuel delivery is achieved without increasing the number of components or overall complexity of the system.

Still another advantage resides in the ability to retrofit existing systems.

Still other advantages and benefits of the invention will become apparent to those skilled in the art upon reading and understanding the following detailed description.

DETAILED DESCRIPTION OF THE INVENTION

Figure 1:
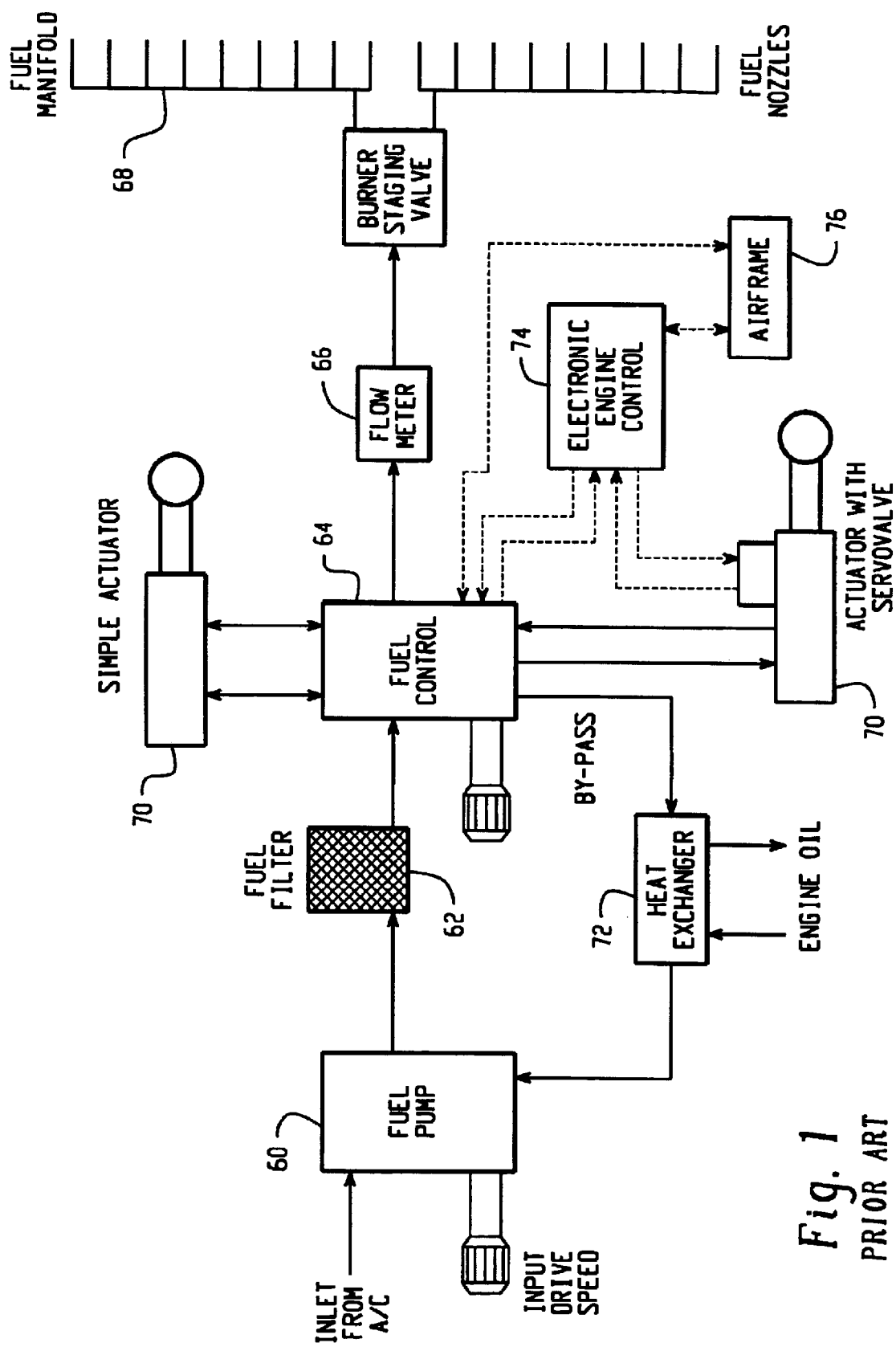
FIG. 1 is a simplified schematic of a typical fuel system.

By way of additional background to the present invention, FIG. 1 represents a high level and more detailed conventional engine fuel system schematic. Since this system is generally known to those skilled in the art, only a brief overview of selected portions is provided in order to appreciate the features and benefits offered by the present invention.

As schematically illustrated in the high level diagram in FIG. 1, a prior art system includes a pump 60 supplying fuel through a filter 62 to a fuel control 64. The pump is a fixed displacement device and therefore delivers a fixed amount of flow to the fuel control based on engine speed. A portion of the pump delivered flow is metered and sent to an engine combustor (not shown). The metered flow portion is supplied to the combustor through a fuel flow meter 66 prior to reaching fuel distribution manifolds and nozzles 68. Another portion of the pump delivered flow is directed to system actuators as represented at 70. The fuel control 64 returns the remaining portion of the delivered pump flow back to the inlet of the pump by directing the fuel through a heat exchanger 72.

In prior art systems, an electronic engine control 74 is used to receive input commands from the airframe 76, receives feedback signals from various sensors on the engine, and provides command signals to effectors on the engine such as the fuel control 64 and system actuators 70. The engine electronic control uses feedback signals from the fuel control to determine and control the quantity of metered flow to the engine combustor. Direct communication (i.e. feedback signals and commands) between the fuel control 64 and airframe 76 also exists.

Figure 2:
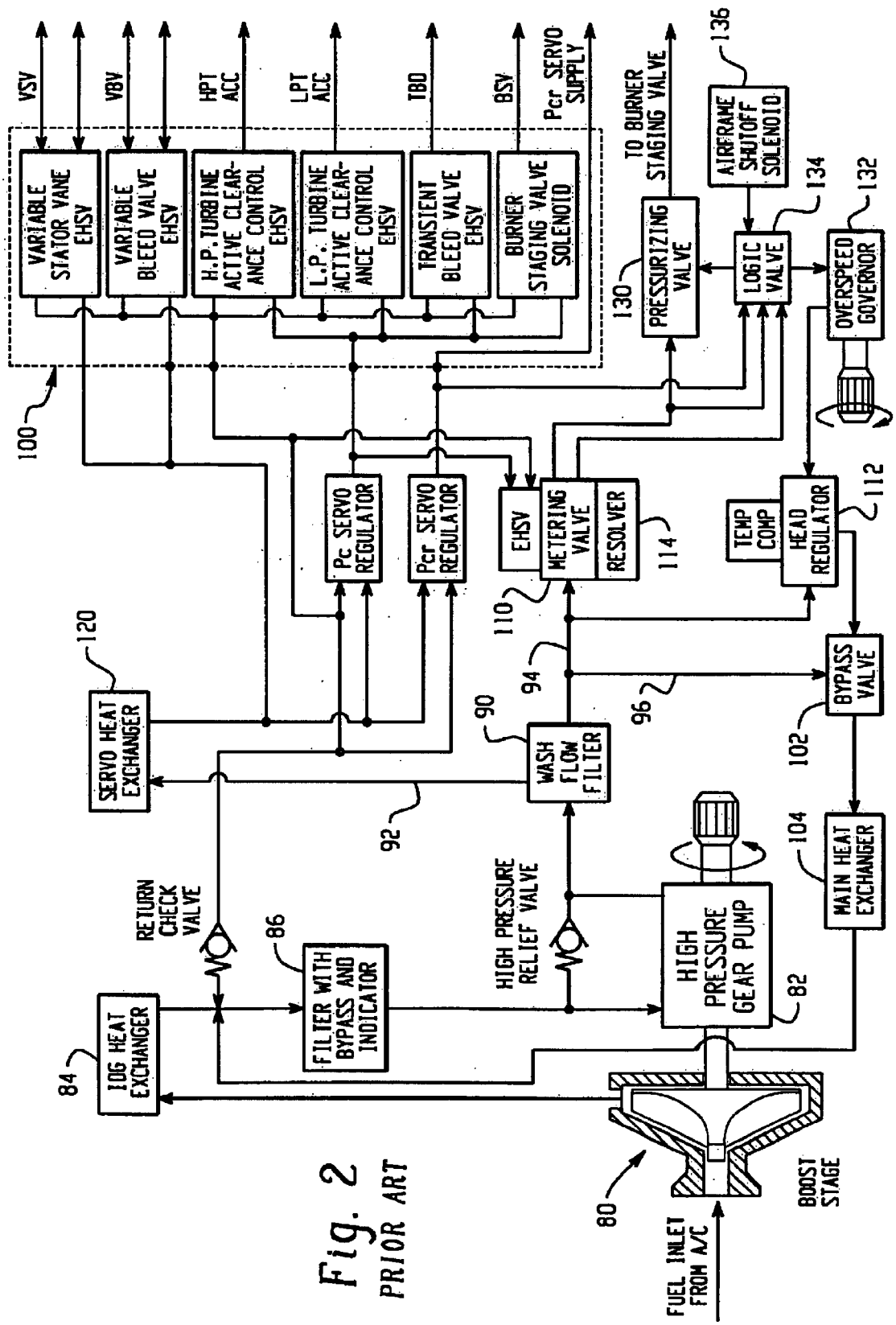
FIG. 2 is a schematic illustration of the fuel delivery system of a conventional system.

FIG. 2 provides a more detailed view of a prior art fuel system. In this system, fuel enters into a centrifugal pumping element 80 from an airframe supply line. The centrifugal pumping element, sometimes referred to as a boost stage, delivers flow and pressure to feed the high pressure pumping element 82. Fuel passes from the boost stage through a fuel/oil heat exchanger 84 and filter 86 prior to entering the high pressure pumping stage. The high pressure pumping stage is a fixed displacement pump that delivers a fixed amount of flow dependent mostly on pump drive speed. The high-pressure stage output flow is directed through a wash flow filter 90 and then is permitted to travel in three paths. These paths are actuation flow 92, metered flow 94, and bypass flow 96.

Actuation flow 92 is provided to system hydraulic type actuators (e.g., variable stator vane electro-hydraulic servovalve, variable bleed valve electro-hydraulic servovalve, high pressure turbine active clearance control, low pressure turbine active clearance control, transient bleed valve electro-hydraulic servovalve, and burner stage valve solenoid) collectively identified by reference numeral 100 that are used to control aspects of the jet engine such as variable geometry and bleed valves that improve engine performance over its wide operating range. Of course it will be appreciated that the various identified actuators are merely terms of art that may vary from one turbine engine or manufacturer to another and should not be deemed to limit the present invention. Metered flow 94 is that flow that is sent to and burned in the engine combustor (not shown) to produce power. Bypass flow 96 is the remaining portion of pump output flow that is unused for actuation and metered flow. The bypass flow is returned through bypass valve 102 to the inlet of the high pressure pumping stage 82 after passing through another fuel/oil heat exchanger 104. In this system, metered flow is established by setting a metering valve 110 to a known position that corresponds to a value of metered fuel flow. Modulation of head regulator 112 and the bypass valve 102 is used to accurately control the pressure drop across the metering valve 110 to a known constant level. Holding the metering valve pressure drop to a known constant value is essential to maintaining the required accurate relationship between metering valve position and metered flow. Metering valve position is typically indicated to the engine electronic control via a position resolver sensor 114.

FIG. 2 also shows the use of a heat exchanger 120 in the actuation supply path. This heat exchanger 120 acts to ensure that fuel used for actuation purposes is sufficiently heated in order to avoid ice build up and subsequent failure of actuation systems under certain flight conditions. The output of this heat exchanger is provided for both fuel control internal use and external actuation system use. The servo regulators and electro-hydraulic servo valves (EHSV) are used to control flow and pressure levels of actuation flow.

The prior art fuel control system incorporates a pressurizing valve 130 in the metered flow path to ensure adequate fuel pressurization for the actuation system during running. The pressurizing valve also serves to shutoff the metered flow path to the combustor when a system shutoff command is issued by the airframe.

The prior art fuel control system also incorporates a hydro-mechanical overspeed governor 132 to limit engine speed in the event of control system failures that would otherwise cause the engine to be uncontrollable. The overspeed governor 132 along with the head regulator 112 provide control signals to the bypass valve 102. When an overspeed is sensed, the overspeed governor provides a signal to open the bypass valve thereby reducing the quantity of flow delivered to the engine combustor.

The prior art fuel control system incorporates features to provide the engine shutoff function. These features include a logic valve 134 and shutoff solenoid 136. Upon receipt of an airframe signal, the shutoff solenoid 136 actuates the logic valve 134 to a shutdown or run condition. The logic valve ports pressure signals to the bypass valve control servos (overspeed governor and head regulator) and to the pressurizing valve 130 such that each may serve its intended function during the shutdown or run modes of operation.

Figure 3:
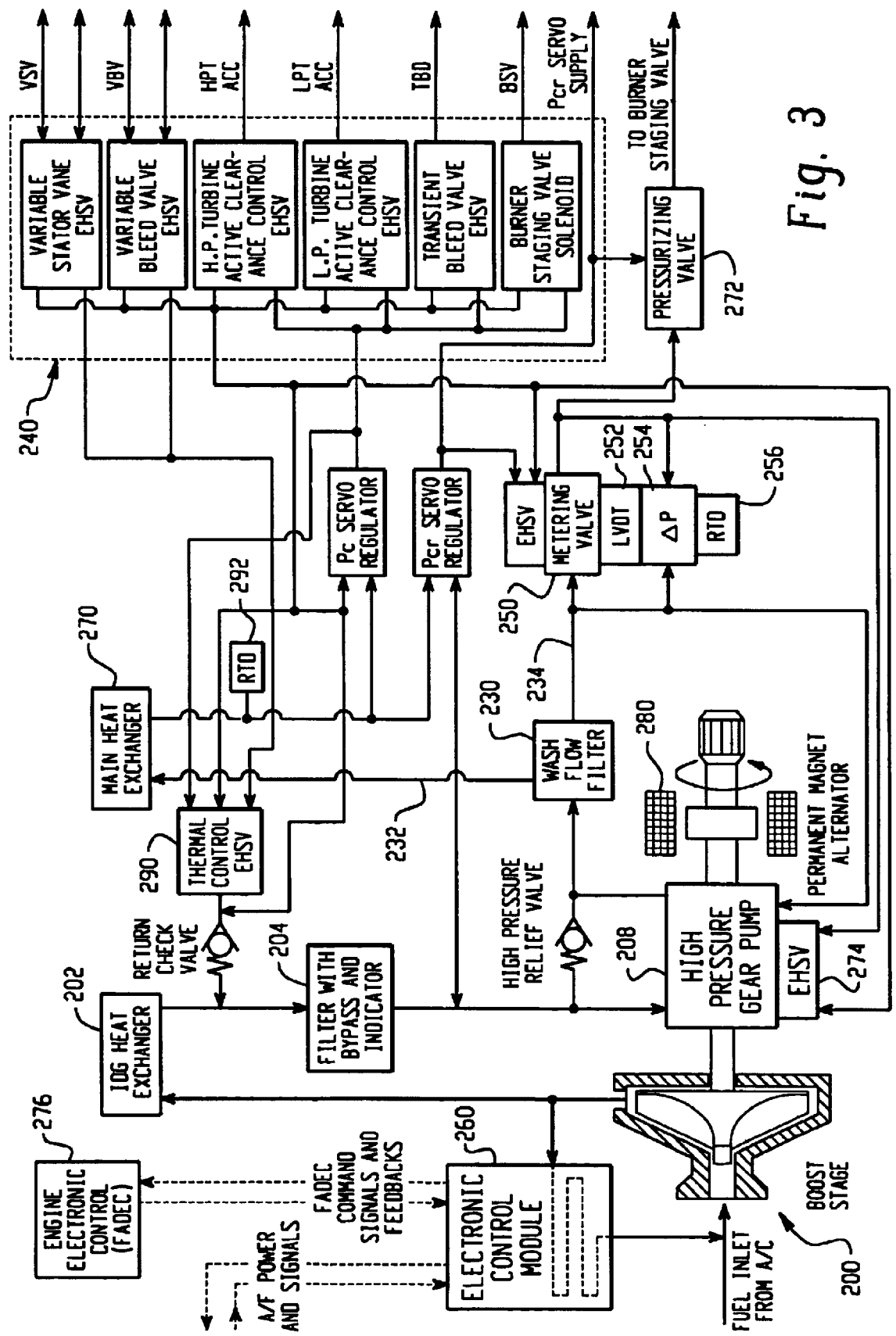
FIG. 3 is a schematic illustration of the fuel delivery system of the improved fuel delivery system of the present invention.
Figure 4:
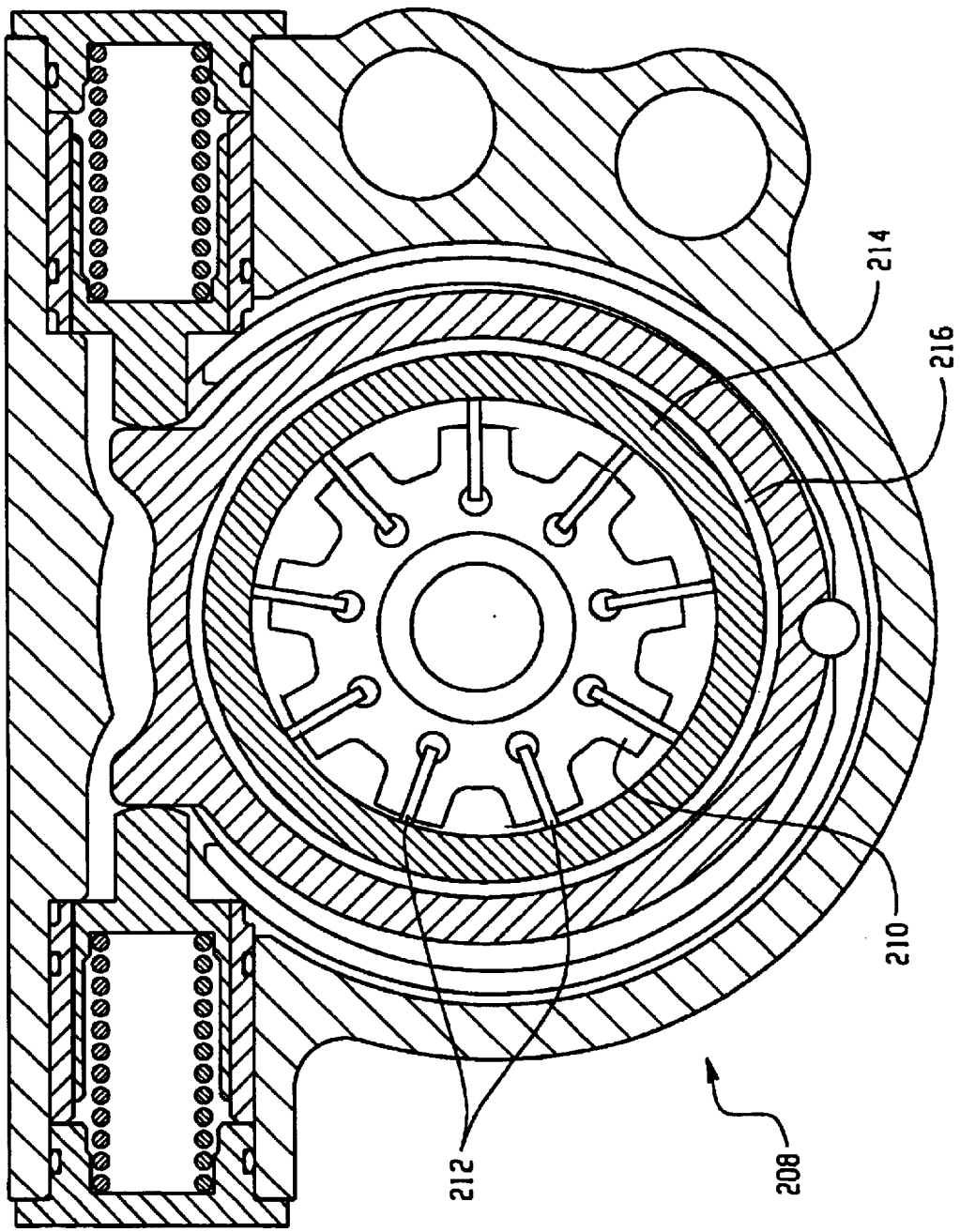
FIG. 4 is a cross-sectional view of the variable flow pump used in the present invention.

FIG. 3 schematically illustrates the fuel delivery system of the present invention. Again, fuel is inlet to a centrifugal boost stage 200. The pressurized fuel then passes from the boost stage through a fuel/oil heat exchanger 202 and filter 204 before being input to a high pressure variable flow pump 208. The particular details of a preferred high pressure pump 208 are shown in FIG. 4, and are also described in greater detail in co-pending PCT/US application Serial No. PCT/US02/09298, filed Mar. 27, 2002, that claims the benefit of U.S. provisional application Serial No. 60/281,634, filed Apr. 5, 2001, the details of which are expressly incorporated herein by reference. However, it will be understood that still other pumps may be used without departing from the scope and intent of the present invention. The preferred, variable flow pump includes rotor 210, which has multiple vanes 212 extending therefrom. A cam ring 214 surrounding the vanes is free to rotat relative to the vanes 212. Thus, substantial losses between the outer tips of the vanes and a stationary cam ring as used in a typical vane pump are not encountered with the present invention. The cam ring 214 is supported in a continuous fluid bearing 216 defined by the pumped fuel. Again more particular details of the variable flow pump may be found in the commonly owned, copending application.

The high pressure pumping stage delivers a controllable amount of flow in response to control signals. The high-pressure stage output flow is directed through a wash flow filter 230 and then is permitted to travel in two paths. These paths are actuation flow 232 and metered flow 234. A bypass flow path is not required since the pump is a variable flow pump. Actuation flow 232 is provided to system hydraulic type actuators, here generally and collectively identified by reference numeral 240 (abbreviations are used to signify different types of electro-hydraulic servovalves or solenoids) that are used to control aspects of the jet engine such as variable geometry and bleed valves that improve engine performance over its wide operating range. Metered flow is that flow that is sent through metering valve 250 to be burned in the engine combustor to produce power.

In this system, metered flow is established by adjusting the position of the metering valve 250 to obtain the desired mass flow. Mass flow is determined by sensing metering valve position (LVDT) 252, metering valve differential pressure (ΔP) 254, and fluid temperature (RTD) 256, and calculating the mass resultant mass flow. An electronic control module 260 to calculate the resultant flow uses sensor inputs and bench level calibration results. With the multiple parameter sensing (i.e. position, differential pressure, and temperature), no longer does the metering valve differential pressure need to be controlled to a highly accurate known value. Instead the metering valve differential pressure is permitted to vary. This ability to permit a variable metering valve differential pressure allows the use of a purely proportional control of the variable flow pump based on metering valve differential pressure.

The use of a purely proportional pump control scheme solves response problems encountered by existing systems utilizing variable flow pumps. The response problem is encountered when a sudden change in actuation flow demand is encountered. The use of the purely proportional control scheme permits the pump output flow response to be extremely quick and yet maintain stability. Systems utilizing a variable flow pump in conjunction with control components (i.e. head regulators) to accurately set a constant known value of metering valve differential pressure are typically slower in response characteristics to maintain system stability.

FIG. 3 also shows the use of a heat exchanger 270 in the actuation supply path. This heat exchanger 270 acts to not only ensure that fuel used for actuation purposes is sufficiently heated in order to avoid ice build up and subsequent failure of actuation systems under certain flight conditions, but also acts to cool engine oil during non-icing conditions just as the main heat exchanger 104 in FIG. 2. The main heat exchanger 270 (FIG. 3) thus replaces and serves the function of two heat exchangers 104 and 120 (FIG. 2).

The present invention fuel control system also incorporates a pressurizing valve 272 in the metered flow path to ensure adequate fuel pressurization for the actuation system during running. The pressurizing valve 272 also serves to shutoff the metered flow path to the combustor when a system shutoff command is issued by the airframe.

As noted above, the prior art fuel control system also incorporates a hydro-mechanical overspeed governor function to limit engine speed in the event of control system failures that would otherwise cause the engine to be uncontrollable. The present invention system of FIG. 3 uses a pump control electro-hydraulic servo valve (EHSV) 274 to modulate pump output pressure and thereby limit delivered metered flow to the engine combustor. Closed loop engine speed control is provided by an electronic control. This electronic control may be external, e.g. from an engine level electronic control 276, or internal e.g. from the system's electronic control module 260. Engine speed sensing is provided to the electronic control from either a sensor on the engine or internally, for example, from a permanent magnet alternator 280. Command signals for the pump control EHSV are provided by the electronic control.

The present invention fuel control system incorporates features to provide the engine shutoff function. Rather than using a logic valve 134 and shutoff solenoid valve 136 (FIG. 2) the airframe signal actuates the pump control EHSV 274 to a shutdown or run condition (FIG. 3). When commanded to shutdown, the variable flow pump 208 is unloaded and metered flow is reduced. The pressurizing valve 272 closes automatically when the pump unloads to ensure a complete shutoff of fuel to the engine combustor.

The present invention fuel control system incorporates features to provide system thermal management. A thermal control valve 290 and temperature feedback RTD 292 are used to control the amount of fuel flow through the main heat exchanger 270. By controlling flow through the heat exchanger, temperature can be controlled to both avoid system icing and overheat of engine oil. Moreover, fuel temperature can be controlled to a lower and constant value as to avoid thermal cycling of fuel system and electronic control hardware. This leads to higher reliability and longer component life. It is also advantageous that the heat exchanger be located upstream of the filter 204 so that icing in the filter can be controlled.

All fuel delivery systems undergo temperature cycling that has a deleterious effect on seal rings, electro-mechanical components, etc. To increase system life, the three separate heat exchangers used in known systems are replaced by a two heat exchanger arrangement in the fuel delivery system of the present invention. This eliminates components and extensive, associated fluid piping.

Figure 5:
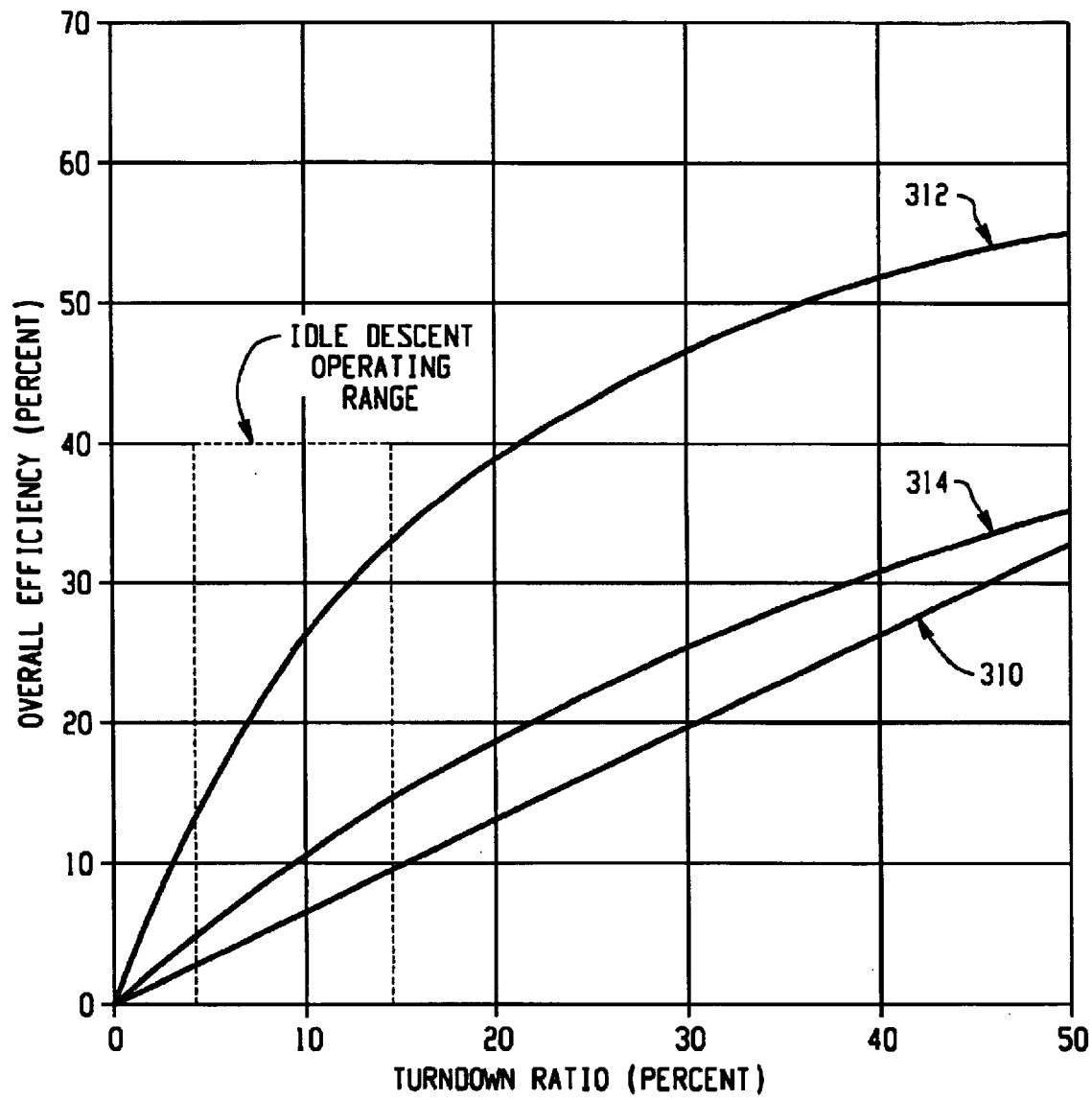
FIG. 5 is a power consumption versus flight condition graphical representation of a typical flight cycle, and particularly illustrating the efficiency at idle descent conditions.

Some of the benefits of the improved variable flow pump used in the fuel delivery system are illustrated in FIG. 5. As shown, the overall efficiency of the gear pump is represented in the lowest, generally linear curve 310. The improved variable flow pump of the present system is illustrated at graph curve 312. A substantial improvement is shown over conventional variable flow pumps (curve 314) with the preferred pumping system at the idle descent operating range. Moreover, the pump has a life expectancy approximately one-third greater than the gear pump and along with the control system described above, uses a significantly reduced number of components to meter fuel and control engine overspeed. Fewer components equate to higher reliability, lower weight, and lower cost, both in original equipment, as well as in retrofit arrangements. The conventional bypass valve, head regulator, and logic select valve function are eliminated from the conventional fuel control architecture with the present fuel delivery system. Likewise, a conventional downstream fuel flow transmitter can be eliminated due to the high accuracy of the control system fuel flow feedback. The electrical overspeed system is capable of trip or shutoff, trim or upper speed limit, and governing or speed setting functions as a result of the electronically controlled closed loop delivery of fuel mass flow. Improved responsiveness and accuracy are achieved with this system. This fuel delivery system is capable of better than plus or minus 2.5% of point flow accuracy across the entire flow range and better than plus or minus 0.5% in limited ranges. Actuation flow steps result in less than 15% of meter flow disturbance for less than fifty milliseconds. All of this is achieved in a fuel delivery system that still satisfies main engine control, hydro mechanical unit function, and fluid metering unit function with a fast response time.

The system is also applicable to retrofitting. That is, fuel delivery systems presently being used can be easily converted or retrofit to obtain the benefits of the present invention. Inserting a variable flow displacement pump for the conventional gear pump and then controlling the operation of the pump based on delivered fuel mass flow from a closed loop arrangement with the metering valve is provided. Moreover, thermal management of the fuel temperature is incorporated via a single heat exchanger and a thermal control valve installed in a recirculating actuator loop disposed in parallel with the variable flow pump.

Thus, eight components of a convention jet engine fuel delivery system include an electronic engine control, a main heat exchanger, a servo heat exchanger, an IDG heat exchanger, a fuel pump and filter, a core speed sensor, a fuel control, and a fuel flow transmitter (plus all of the piping and wiring to connect these components together). With the present invention, the number of components is reduced to three, namely, a fuel delivery component, heat exchanger, and electronic control to combine fuel pumping, filtering, metering, thermal management, and fault monitoring and reporting in a compact unit, as well as a significant reduction in wiring and piping. The system requires less input power, which means less fuel consumption and lower system fuel temperatures. This also means there is a significant reduction in fuel, a significant reduction in maintenance costs, and lower weight. Still further, a major advantage results from significant reduction in operating costs because the system is more efficient during descent, a cooler fuel delivery system that avoids the conventional excess fuel temperatures that stress components, shorten component life, and increase component maintenance and replacement costs.

The invention has been described with reference to the preferred embodiments. Obviously, modifications and alterations will occur to others upon a reading and understanding of this specification. For example, the system has been described relative to the variable flow pump of FIG. 4, although it is recognized that still other pumps, variable or fixed flow, can be used with minor alteration to the concepts described herein. The invention is intended to include all such modifications and alterations insofar as they come within the scope of the appended claims or the equivalents thereof.

Having thus described the invention, it is now claimed:

1. A fuel delivery system comprising:
    a pump for pressurizing, fuel;
    a metering valve downstream of the pump for selectively regulating fuel delivery; and
    a mass flow controller for regulating a desired mass flow of fuel to an associated turbine engine, the mass flow controller including an electronic control means providing a closed loop of metered mass flow by providing a sensed signal indicative thereof and for altering pump operation in response thereto.

2. The invention of claim 1 wherein the control means includes a metering valve position sensor.

3. The invention of claim 1 wherein the control means includes a metering valve differential pressure sensor.

4. The invention of claim 1 wherein the control means includes a metering valve fluid temperature sensor.

5. The invention of claim 1 wherein the pump is a variable flow pump.

6. The invention of claim 1 further comprising a thermal controller that monitors fuel temperature to avoid thermal cycling of the fuel delivery system.

7. The invention of claim 6 wherein the thermal controller includes a control valve interposed between actuator supply and return lines.

8. The invention of claim 7 further comprising a heat exchanger located downstream of the pump and upstream of the thermal control valve for controlling the temperature of an associated actuation system.

9. The invention of claim 6 wherein the thermal controller includes a closed loop extending from a pump outlet, through a heat exchanger, through a thermal control valve, and through a filter before entering a pump inlet.

10. The invention of claim 1 wherein fuel mass flow is electronically calculated by the control module by multiplying the change in pressure with the specific gravity of the fuel, area of a fuel passage opening, and a constant.

11. A method of controlling fuel delivery to a turbine engine comprising the steps of:
    pressurizing fuel through a pump;
    metering the fuel through a metering valve for supply to associated fuel nozzles; and
    controlling mass flow of the fuel by monitoring the change in pressure through the metering valve; and
    electronically calculating the fuel mass flow and varying the pump in response thereto.

12. The method of claim 11 comprising the further step of providing a thermal control valve and heat exchanger downstream of the pump for controlling fuel system temperature.

13. The method of claim 12 comprising the further step of providing a path for fuel exiting the heat exchanger to recirculate to the pump a portion of fuel directed to actuators.

14. A fuel delivery system comprising:
    a pump for pressurizing fuel;
    a metering valve downstream of the pump for selectively regulating fuel delivery;
    a thermal controller that monitors fuel temperature wherein the thermal controller includes a control valve interposed between actuator supply and return lines; and
    a mass flow controller for regulating a desired mass flow of fuel to an associated turbine engine.

15. The invention of claim 14 further comprising a heat exchanger located downstream of the pump and upstream of the thermal control valve for controlling the temperature of an associated actuation system.

16. The invention of claim 14 wherein the thermal controller includes a closed loop extending from a pump outlet, through a heat exchanger, through a thermal control valve, and through a filter before entering a pump inlet.

17. The invention of claim 11 wherein the electronically calculating step includes the steps of multiplying the change in pressure with the specific gravity of the fuel, area of a fuel passage opening, and a constant.

* * * * *